United States Patent
Keel et al.

(10) Patent No.: US 7,640,511 B1
(45) Date of Patent: Dec. 29, 2009

(54) METHODS AND APPARATUS FOR MANAGING AND INFERRING RELATIONSHIPS FROM INFORMATION OBJECTS

(76) Inventors: Paul Erich Keel, 872 Massachusetts Ave., Apt. 1004, Cambridge, MA (US) 02139; Jeffrey Huang, 289 Nashoba Rd., Concord, MA (US) 01742

( * ) Notice: Subject to any disclaimer, the term of this patent is extended or adjusted under 35 U.S.C. 154(b) by 622 days.

(21) Appl. No.: 11/118,301

(22) Filed: Apr. 29, 2005

Related U.S. Application Data

(60) Provisional application No. 60/566,723, filed on Apr. 29, 2004.

(51) Int. Cl.
*G06F 3/048* (2006.01)
*G06F 7/00* (2006.01)

(52) U.S. Cl. .......................... 715/769; 715/753; 707/3; 707/102

(58) Field of Classification Search .................. 715/751, 715/753, 769, 837, 971; 345/331; 707/3, 707/102
See application file for complete search history.

(56) References Cited

U.S. PATENT DOCUMENTS

| | | | |
|---|---|---|---|
| 5,751,286 A * | 5/1998 | Barber et al. ................ | 715/835 |
| 6,486,898 B1 * | 11/2002 | Martino et al. .............. | 715/853 |
| 6,572,660 B1 * | 6/2003 | Okamoto ..................... | 715/272 |
| 7,043,702 B2 * | 5/2006 | Chi et al. ..................... | 715/853 |
| 7,318,052 B2 * | 1/2008 | Bauer et al. .................. | 706/46 |
| 7,373,603 B1 * | 5/2008 | Yalovsky et al. ............ | 709/203 |
| 2003/0160825 A1 * | 8/2003 | Weber ......................... | 345/769 |
| 2004/0036716 A1 * | 2/2004 | Jordahl ....................... | 345/713 |
| 2005/0034079 A1 * | 2/2005 | Gunasekar et al. .......... | 715/753 |

OTHER PUBLICATIONS

Patrick Winston et al. "EWALL, Electronic card wall", Jan. 2004, 20 pages.*
Thorsten Prante et al., "Developing CSCW tools for idea finding-empirical results and implications for design", Nov. 2002 p. 106-115.*
EWALL, Electronic Card Wall, Patric Winston et al. pp. 1-25, Jan. 14-16, 2003.*

\* cited by examiner

*Primary Examiner*—Kieu Vu
*Assistant Examiner*—Haoshian Shih
(74) *Attorney, Agent, or Firm*—Chapin IP Law, LLC

(57) ABSTRACT

A system identifies information based on relations between information objects. The system identifies a first set of information objects that each includes associated positional information. The system identifies at least one spatial relation between the first set of information objects based on a spatial arrangement of the information objects as determined by positional information associated with the first set of information objects. The system further identifies a second set of information objects based on the relation(s) between the first set of information objects and outputs an identity of the second set of information objects. A unique card layout is also disclosed.

29 Claims, 9 Drawing Sheets

METHODS AND APPARATUS FOR MANAGING AND INFERRING RELATIONSHIPS FROM INFORMATION OBJECTS

PRIORITY TO EARLIER FILED PROVISIONAL PATENT APPLICATION

This application claims the benefit of the filing date of earlier filed co-pending United States Provisional Patent Application having Ser. No. 60/566,723 entitled "METHODS AND APPARATUS FOR MANAGING AND INFERRING RELATIONSHIPS FROM INFORMATION", filed Apr. 29, 2004 and that shares co-inventorship with the present application. The entire teachings and contents of this Provisional Patent Application are hereby incorporated by reference herein in their entirety.

GOVERNMENT RIGHTS

This invention was made with government support under Grant Nos. N00014-02-1-0132 and N00014-04-1-0569, awarded by ONR. The government has certain rights in the invention.

BACKGROUND

Modern information processing systems allow users to collect and process large amounts of information. As an example, a typical computer system such as a personal computer includes an operating system that executes within the computer system to provide a graphical user interface to users of that computer system. A conventional graphical user interface typically includes a number of information objects such as graphical icons that represent information of relevance or importance to the user. The user accesses data and controls functionality of the computer system by selecting and operating such icons. By way of example, software applications such as word processors, graphical editing tools, web browsers and many others often provide graphical user interfaces that include a number of icons that have visual meaning to the user of the computer system. Typically, a software application renders icons to allow the user to invoke specific functionality or commands of that application and/or to allow the user to organize and access data. Many software applications use icons to represent data or files that the user can access by selecting (e.g., clicking) the icon representing the data. As an example, if a user selects an icon that represents a software application installed within the computer, the computer will begin execution of that application. Other icons on a graphical user interface can represent folders or files maintained by the operating system within a file system.

Many conventional software applications allow a user to develop or collect various portions of information or content for storage and future access. As an example, a word processor or other editing tool allows the user to create and edit documents. As another example, a web browser allows a user to navigate web pages provided by servers on remote computer networks such as the Internet to reference information on a variety of subjects. A conventional computer system allows a user to store information referenced or created by such applications as a set of documents or files that can be retrieved by the user at a later time.

Most conventional operating systems and many software applications also provide a way for a user to arrange a file system of the computer in order to organize documents and files in a manner that makes sense to the user. Computer operating systems typically organize file systems in a hierarchical manner allowing the user to create folders or directories with user-specified names. The user can store files within the folders in a manner that makes sense to that user. A file system is thus one of the most popular ways for users to organize and manage data and information of interest to those users.

Another mechanism that conventional applications and operating systems provide to allow users to organize and manage information of interest to that user is the ability to allow a user to spatially arrange information objects such as graphical icons in a way that makes intuitive sense to the user. As an example, on a conventional "desktop" work area provided by many operating systems, a user can place or position icons representing files, documents, applications, email messages, appointments or the like in any manner and at any position that the user may choose. In particular, such conventional applications allow the user to graphically maneuver the icons into position in relation to one another in a manner that makes sense to that user. Different users often organize icons on their desktop in different ways.

SUMMARY

Conventional mechanisms and techniques that allow a user to visually organize, collect and manage information objects that represent various portions of information suffer from a variety of deficiencies. In particular, conventional computer-based applications such as operating system desktops and software application graphical user interfaces allow a user to collect and store numerous portions of content and information that are of interest to the user and allow a user to represent that information graphically (e.g. via icons), but do little to analyze relations that may exist between the icons and/or between the stored portions of content or data. In particular, conventional information processing systems such as those noted above allow a user to organize and arrange various portions of data or other information as icons in a graphical user interface in a manner that makes sense to the user, but such systems perform no analysis of the arrangement of icons defined by the user in order to assist the user in identifying additional information that may be of interest to the user.

Another deficiency with conventional information processing systems is that information is represented in different formats and, depending on the format, is stored in different locations. For example, conventional browsers store hyperlinks to web sites as bookmarks, whereas emails are located in mailboxes in mail handlers, files are stored in computer directories, and notes may be stored in files, and so forth. The proposed information object mechanism disclosed herein, referred to in some embodiments as cards, solve this deficiency by introducing a standardized information format that represents a piece of information in an abstract way and links to an original piece of information and that has a standardized look thus allowing users to focus on and compare the information content and context rather that be distracted by the information format and location.

As an example of problems with conventional data processing systems, a user using a conventional content development application may spend large amounts of time collecting portions of content such as graphics, text, news stories, web pages, email messages, or other such information sources for collaborative production of a large content-based research project. Many users may be involved in this process. As each user collects portions of information using conventional information management systems, the users store and organize their respective portions of information within the computer file system. Each user may create icons on his or her desktop or other work areas that represent the respective portions of collected information. Each user might group icons for related pieces of information together in a list, within close proximity to each other, or in file directories. In conventional systems however, it is up to the user to identify what other portions of information might be of interest to the user that the user has not already identified and collected.

As an example, if the collaborative production being developed by the users is a project related to current events, each user may collect articles and stories related to that current event. Using conventional systems, it is up to each user to research and discover stories or other content related to that current event that might be available from a variety of different information sources. While conventional collaboration systems might provide a common repository for such collected information contributed by each user, there is little or no ordering to this information, other than an order specified by the users who place the content into the shared repository such as a file system or database. Each user must frequently communicate with other users in a highly manual manner (e.g. via a telephone call, email or other mechanism) to identify content that other users may have discovered and collected that might be of relevance to the production under development.

Such conventional information management systems do not automatically and dynamically analyze relations between user placed icons that represent the various pieces of available information in order to assist users in identifying other portions of content that many of interest to those users. More specifically, conventional systems do not analyze specific spatial relations, collaborative context relations, chronological context relations, and the like between information sources associated with icons arranged by a user to determine other portions of information, such as other portions of content collected by other users, that may be of relevance or interest to the user providing a specific spatial arrangement of his or her icons. As a result, conventional information management systems limit a user's knowledge of other available content and information to which that user may have interest. In particular, such systems limit available content to that content that a user can discover on their own.

As an example, using a conventional information discovery processes such as web searching, a user can quickly become overwhelmed with search results that are irrelevant to the information they are seeking. While some conventional web sites may attempt to suggest references to web pages that are similar in nature to those discovered when providing a particular search term, such additional references are simply provided based on frequently performed searches of other users and do not take into account current information already collected by the user performing the original search. Thus a conventional browser is not made aware that a user already has collected certain related pieces of information and has organized them in a spatially related manner.

In contrast, embodiments of the invention are based in part on the observations that conventional information collection management systems provide a significant cognitive burden on users caused by the increasing availability of information, the requirement for users to actively initiate a search for relevant information, the requirement for evaluation of the quality and feasibility of information, the need to collaborate remotely and asynchronously, as well as the necessity to dynamically adapt to changing circumstances. Modern information processing systems do not provide an automated ability to organize and identify information sources that come in many different formats. For example, information may be received in the form of a phone call, an email, an instant message, a computer file, a web site, a database item, a verbal comment, a radio transmission, a newspaper, a television spot, a magazine, or a security camera. The various formats often prevent the easy and efficient collection, organization, and comparison of information by conventional information processing systems.

Embodiments of the invention as disclosed herein provide mechanisms and techniques for identifying information based on relations that are discovered between arrangements of information objects, such as spatial arrangements of icons positioned on a graphical user interface of a computer system. The system disclosed herein provides a computational environment for the support of individual and collaborative decision-making and greatly enhances the quality and the speed of individual and collaborative brainstorming, problem-solving, information collecting and decision-making processes.

More specifically, the system disclosed herein includes a relation manager that provides mechanisms and techniques for identifying new and relevant information based on automatically established relations between existing (previously created and collected) information objects. In operation, the system identifies a first set of information objects. Each information object includes associated positional information. In a graphical user interface example, this may include a user displaying a first set of icons or other graphical objects on a graphical user interface. The positional information associated with each information object is a location of each graphical object on the graphical user interface. In one configuration, the information objects are represented as "cards" on a graphical user interface. Cards reference different types of information formats thus making it easier for users to directly compare and study information in different formats. As used herein the term "card" and "information object" are used interchangeably, and a card is one example configuration or representation of an information object. A card includes a graphic icon area to display text or a picture associated with an information source, as well as other information pertaining to such things as ownership of that card, creation time of the card, and attribute indicators that indicate a current state of the card, and a hyperlink to its associated information source. In a simplest embodiment, a card is just an icon that represents some information and information represented by cards may be stored in different locations and in different formats. In one configuration, a card is different from an ordinary icon because it comes with hidden functionality such as a built-in instant messaging system and the ability to drag and drop content onto the card.

The system identifies at least one relation between the first set of information objects based on a spatial arrangement of the information objects as determined by positional information associated with each information object. In one configuration, the system applies a spatial relation algorithm that discovers spatial relations between positional information of at least two card records in a card database that are associated with cards displayed on the graphical user interface in the first set of cards. The relations between information objects/cards can be stored in a database and the system can use discovered relations to identify a second set of information objects based on the relation(s) between the first set of information objects/cards. The second set of information objects in a card configuration is a second set of cards that might be of interest to the user based on the analysis of the cards already on display in a workspace view associated with that user. The system can output an identity of the second set of information objects by displaying the second set of cards on the graphical user interface for viewing by the user. The second set may be displayed in a prioritized and relevant manner based on relations discovered concerning the first set of cards.

In this manner, the system can perform analysis of the user defined arrangement of cards and can use this information to show the user other sources of information, possibly from other users, or from a database, or from a dynamic source such as a news feed, that might be of interest to that user. The system can thus assist a user in managing information and retrieving relevant information.

Embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include various graphical representations of the cards themselves, for example as displayed on a graphical user interface as will be explained in more detail.

It is to be understood that the system of the invention can be embodied strictly as a software program, as software and hardware, or as hardware alone such as within a processor, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
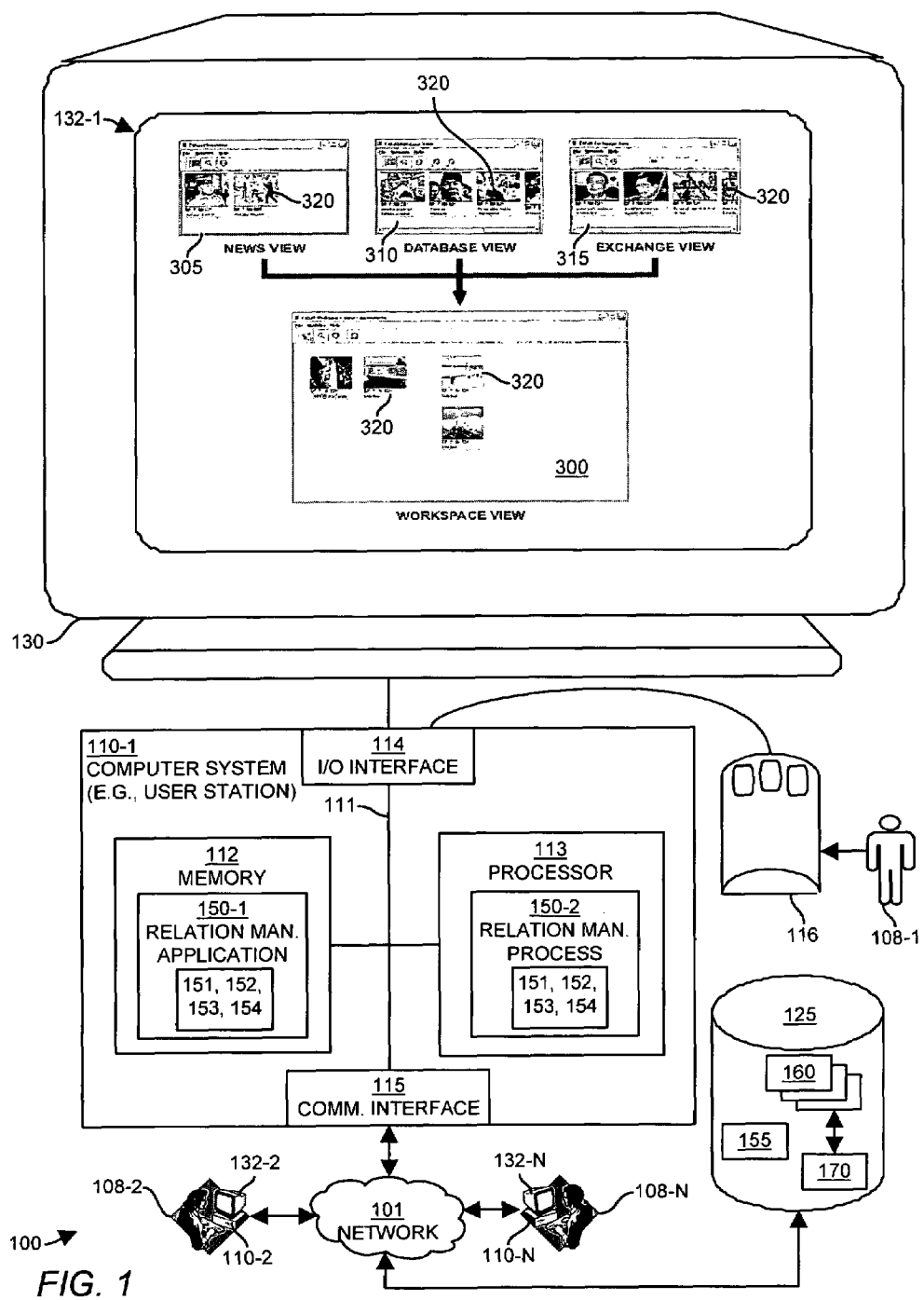
FIG. 1 is an example network environment including computer systems configured with a relation manager in accordance with one example embodiment disclosed herein.

FIG. 1 illustrates the computer-networking environment 100 suitable for use in explaining example embodiments of invention. The computer-networking environment 100 includes a network 101 such as a local area network (e.g., LAN) that interconnects a plurality of computer systems 110-1 through 110-N that each execute respective relation managers 150 (application 150-1 and process 150-2) under respective control of a plurality of users 108. The computer systems 110 may be any type of computerized device such as a personal computer, laptop, workstation, mainframe terminal, or the like. In this example, each computer system 110 generally includes in interconnection mechanism 111 such as a data bus, motherboard or other circuitry that interconnects a memory 112, a processor 113, an input output interface 114 and a communications interface 115. A display 130 such as a computer monitor and input output mechanism 116 couple to the computer system 110 via the input output interface 114. The communications interface 115 allows communication with other computer systems 110-2 through 110-N over the network 101. The architecture of the computer system 110-1 is shown in FIG. 1 by way of example only. It is to be understood that the details of the example computer systems 110-2 through 110-N can be similar to those of computer system 110-1 but are not shown in FIG. 1 due to drawing space limitations.

The memory 112 within each computer system 110 may be any type of computer readable medium such as random access memory (RAM), read only memory (ROM). The memory 112 may be fixed or removable from the computer system 110, such as a floppy disk, magnetic disk, optical disk media (e.g., CD ROM) or the like. The memory 112 is encoded with computer program logic (e.g., software code) that includes a relation manager application 120-1. When the processor 113 executes the relation manager application 150-1, the processor 113 produces a relation manager process 150-2 that executes as explained herein to produce a graphical user interface 132-1 (the example being produced by the relation manager 150 in computer 110-1) on the display 130 for viewing by the user 108. The relation manager process 150-1 and application 150-2 are collectively referred to herein as simply the relation manager 150. When referring to the relation manager 150, it can thus be a reference to the executing process 150-2, the application code 150-1, or both.

Each relation manager 150 produces a graphical user interface 132 that provides, to the user 108, visual knowledge representation, interpretation and management based on spatial relationships. To do so, the relation manager 150 includes a workspace server 151, a news server 152, an exchange server 153 and a database server 154 that each produce, respectively, a workspace view 300, a news view 305, a database view 310 and an exchange view 315 within the graphical user interface 132.

The workspace server 151 produces the workspace view 300 that in one configuration is a graphical user work area, such as a desktop, in which a user 108 is able to create and manipulate graphical information objects referred to in this configuration as "cards" 320 that graphically represent information objects of interest to user 108. The workspace view 300 helps users 108 to create, collect, organize and understand information associated with each card 320 and the relationships among information represented by the cards 320. In one configuration, a generic client application such as a web browser accesses such views from respective servers 151 through 154 that may execute on the same or different computer systems 110. In another alternative configuration, a dedicated client application includes or provides the workspace view, the news view, the database view, and the exchange view and implements the news server, the database server, and the exchange server. It is to be understood that the system described herein may be distributed or centralized and may operate among many computer systems with many users 108.

Figure 2:
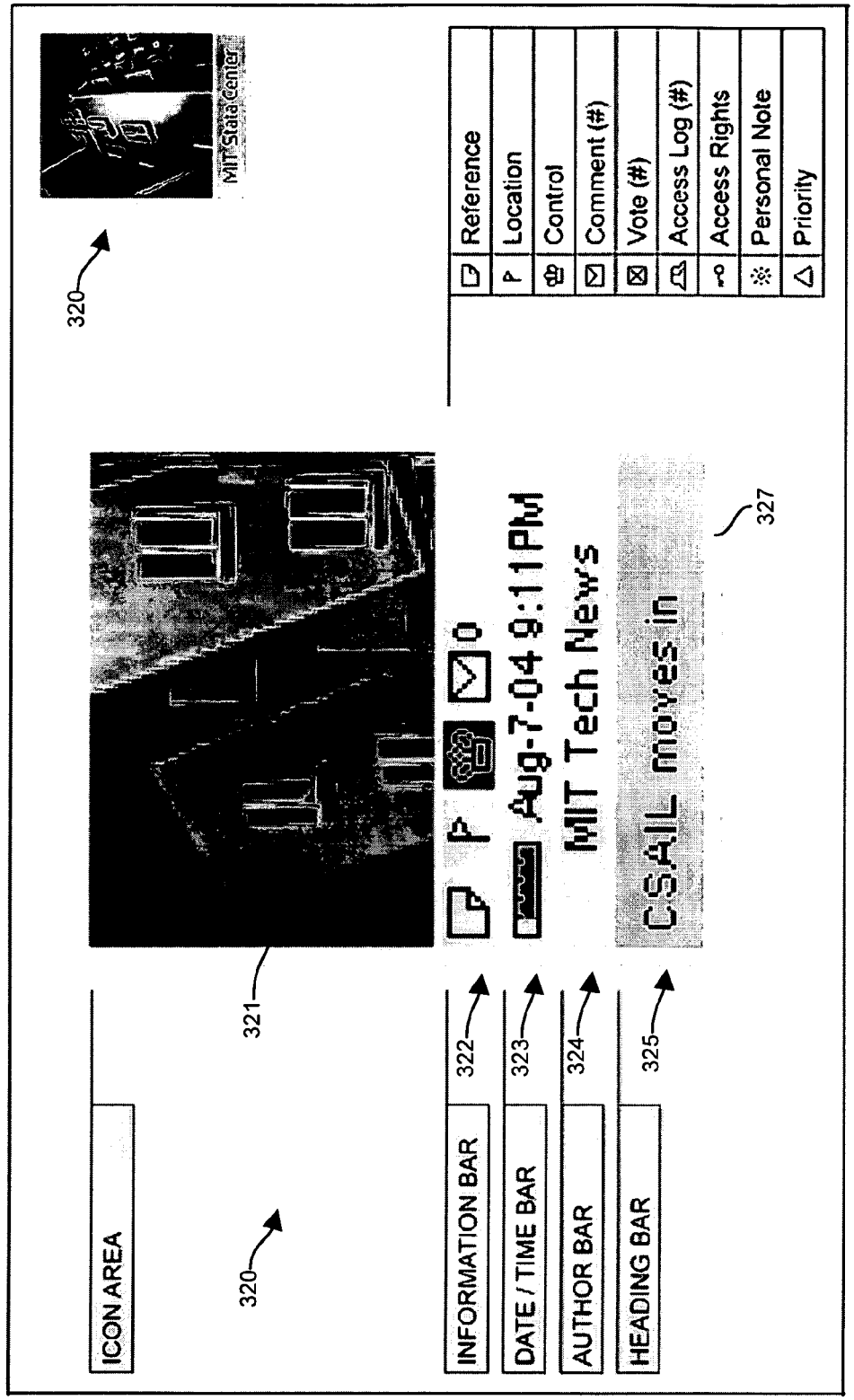
FIG. 2 show an example layout of a card in accordance with one example embodiment disclosed herein.

Directing attention briefly to FIG. 2, an example layout of an information object in the form of a card 320 is shown. A card 320 in this example provides a visually compact, standardized, and abstract representation of information that displays, reminds of, and/or links to the original piece of information associated with that card 320. Generally, a card 320 is any graphical representation of an information object and may be considered the information object itself. The term "card" as used herein can thus include anything from a simple icon that represents something such as a web page, a document, or a live information source, or a card can be a more complex representation of such things. Both, the layout and the functionality of cards 320 are highly modular in one configuration. This means that visual components and computational features can be individually turned on and off, and that additional visual components and computational features can easily be integrated. Furthermore, the colors and fonts of all card components are customizable. Cards 320 are visually subdivided into six segments in one configuration that can expand and contract depending on their contents.

The icon area 321 allows for the placement of graphical and/or textual material that can help users 108 to quickly visually locate cards among many other cards as well as to memorize and recall the data, information or knowledge associated with that card 320. Users 108 can copy and paste pictures and text from various computer applications into the icon area. Users can also drag and drop pictures and text from web browsers and file managers into the icon area 321. Furthermore, users can directly draw and write into the icon area 321. The background color of the icon area 321 is also customizable allowing users to visually group and highlight cards. Typically, the icon area 321 includes a card graphic such as an icon, picture or other graphical information that represents information associated with that card. As an example, if an HTML document such as a web page is of interest to a user, that user can create a card to represent that web page. The card can include a picture from the web page or a reduced sized version of the web page as its graphic.

The cards 320 include an information bar 322 that accommodates an interface and visual indicators for complementary card functions. A small rectangular box that contains an icon or in some cases a numerical counter represents each available card function. Three distinct colors visually indicate the status of each function. In one configuration, the color gray is used for inactive functions, the color green is used for active functions and the color red is used for functions that require user attention. Every function can be individually turned on and off. The information bar 322 also allows for the customization and addition of functions specific to particular situations and work tasks. The following is a list of example functions and is not intended to limit the invention to information objects (e.g., cards 320) containing such functions. A reference function allows users to hyperlink or to attach related information. A location function is used to associate cards with a geographic location. A control function enables automatic card updates. A comment function allows for the addition of comments and annotations. A vote function allows collaborating users to exchange their opinions about the relevance of cards. An access log function provides users with a detailed record about the card history. A personal note function is used to announce and send cards to specific users. A priority function allows users to categorize and highlight Cards.

The date/time bar 324 displays the date and time of the most recent card modification. The relation manager 150 can use the date/time bar indication to reconstruct the chronology of contributions from different users and sources. The author bar 325 displays the name of the user who last modified the card 320 or the information source the card 320 has been copied from. The author bar 325 provides an indication of the card editor and is used to compare contributions from different users and sources.

The heading bar 326 allows users 108 to complement cards with a brief description or some keywords such as a title. The heading bar 326 effectively complements the icon area 321 by introducing language as an additional means for the abstract representation of data, information and knowledge. While the icon area 321 is particularly useful for the visual navigation of large card arrangements, the heading bar 326 is focused on supporting the quick and easy recollection of card meanings and contents.

The creation and use of cards 320 can fundamentally shift the way analysts and decision-makers comprehend and think about information during sense-making activities. The creation of cards engages users 108 into a process of converting, standardizing, abstracting, and associating information while the use of cards 108 fosters a strong focus on relating information uninfluenced by the format and location of information. Humans like to think of data, information and knowledge as objects that they collect, compare, and organize. The conversion of data and information (as well as the externalization of knowledge) into virtual and physical objects accommodates this way of thinking. Dealing with virtual and physical objects such as files on a computer desktop or documents on a table effectively increases a human's ability to deal with complex sense-making tasks. A standardized card size and layout is convenient to collect, compare, and organize cards. Configurations disclosed herein are based in part on the observation that the benefits of standardized information objects are present in various everyday objects. For example, index cards, credit cards, business cards, slides, photographs and postcards are usually of equal size and layout so they can conveniently be stored, accessed, and processed. The abstract representation of data, information and knowledge with cards engages a human's visual recognition in ways that decreases information access time and allows for the processing of large amounts of information. Furthermore, the process of creating cards 320 requires users to circumscribe the contents associated with cards in a visually and mentally fast accessible and easily comprehensible format thus encouraging a more careful analysis and understanding of the contents associated with cards. The concept and use of abstract visual and textual reminders is also present in various everyday objects. For example, desktop icons and thumbnail views allow users to easily locate and organize computer files.

Military ribbons use abstract visual representations to provide service, mission and award specific information on a small clothing area. Traffic signs depend on abstract visual representations that are easy to spot and understand by pedestrians and car drivers.

In one configuration, a card 320 does not contain information per se but only serves as a reminder for the presence of a particular piece of data, information or knowledge. The separation between cards 320 and content associated with cards allows for the compact visualization and organization of large amounts of information. A card 320 may be viewed as a meaningfully labeled hyperlink to a piece of content available in a remote location. Users 108 can easily arrange and rearrange cards in the workspace 300. Users 108 benefit from this process by developing a good understanding of the card contents and the relations among cards (context). The use of card arrangements also benefits collaborative sense-making tasks. People of different backgrounds, interests and foci have their unique ways of relating information. The collaborative development of card arrangements can help people to determine intersecting views as well as to develop a shared understanding of a particular information space. Information objects are thus each represented as respective cards 320 in this configuration.

The card attribute indicators shown in FIG. 2 can indicate a card state that can include such things as ownership of the card, a geographic location associated with the card, a time of creation of information associated with the card, and other information. Depending upon the configuration, each card 320 can further include features such as an instant messaging capability allowing to users in a distributed system to share access to a card in order to exchange comments or messages between themselves concerning information associated with the card. In one configuration, the system displays, within the card perimeter, at least one messaging icon operable by a user to send a message to a card associated with at least one other user, thus enabling collaboration. In one configuration, clicking on the messaging icon allows users to add a time/author stamped message to a card 320 that all users 108-2 through 108-N can see if they have a copy of this card 320. For any user 108, the icon lights red if the card 320 contains new messages that the user has not yet looked at, green if it contains messages that the user previously looked at, and gray if the card contains no messages. It is to be understood that a reference to a Card 320 refers to an implementation of an information object, and as will be explained shortly, algorithms disclosed herein can analyze information about cards, such as spatial relationships between cards, and that such algorithms and processing can be applied to other representations of information objects besides cards, such as desktop icons, physical locations of physical items such as items on a store shelf, and so forth.

Returning attention back to the graphical user interface 132 in FIG. 1, the workspace view 300 presents users with an empty canvas for the creation and grouping of cards 320. In one configuration, the workspace view 300 can be the desktop of a computer system 110 provided by an operating system, such as the Windows Desktop provided by the Windows family of operating systems made by Microsoft Corporation of Redmond Wash., USA (Windows is a registered trademark of Microsoft Corporation). The workspace view 300 is designed to support individual and collaborative sense-making tasks such as information analysis, planning, decision-making, brainstorming, and problem-solving. The workspace view 300 functionality will provide users 108 with the means to efficiently create, collect, organize, analyze, and discuss information. In one configuration, cards 320 may be created manually or semi-automatically. The manual creation of cards 320 requires the user 108 to position an empty card 320 on the workspace view 300 and complement it with a picture, a heading, and a reference to an information source by simply dragging and dropping pictures, texts, hyperlinks, files, or file folders onto Cards 320. The semi-automatic creation of cards 320 allows users to drag and drop pictures, text, hyperlinks, URLs, files, and file folders directly onto the workspace view 300. This action will cause the workspace server 151 to create a new card 320 with the content of the dropped item linked or attached to the card 320 and with a picture and a heading added to an icon area and the heading bar (to be explained) of the card 320. Users 108 may also copy cards 320 from the news view 305, the database view 310 or the exchange view 315. Furthermore, a user 108 can copy cards 320 from the workspace view 300 to the computer desktop or file system (and vice versa) thus converting cards 320 into regular computer files. This functionality has a variety of applications such as to exchange cards 320 by email or to convert cards 320 for use with other software applications. Automated card creation is provided as well that allows a user for example to specify a file system or path or URL or database identity and the system can traverse records, documents, web pages, files and the like within the specified path, database or domain and can convert each record, file or page into a card for use in the system.

The relation manager 150 allows a user to easily arrange, compare, and evaluate cards 320 thus ensuring that users 108 will not be distracted by different information formats but focus on information contents. Each individual user 108 can determine the particular arrangement or spatial (vertical, horizontal, overlapping, proximal) layout of the graphical cards 108 on his or her workspace view that might indicate meaning to that user 108. For example, a user 108 may group cards that represent related information sources in a relatively close proximity to one another thus defining tight spatial relationships between those cards.

The system is able to analyze spatial relationships that exist between cards 320 in each users workspace view 300 in order to identify other information objects (e.g., other cards 320) that may be of interest to that user 108. Based on this analysis, the relation manager 150 can identify other information sources by showing other cards 320 that might be of interest to that user. Embodiments disclosed herein are based in part on the observation that the spatial arrangement of a first set of objects such as cards 320 in the workspace view 300 can be used to identify relationships between those objects and can be further used to identify other objects (such as other cards) that may be of importance to a user who created the initial spatial relation between the first set of objects in the workspace view 300.

The workspace view 300 introduces several options for the grouping of cards 320. One option is to increase the size of one card 320 so as to accommodate several other cards 320 inside its boundaries. Moving a card 320 will drag along all cards 320 within its boundaries. A second option is to overlap cards 320. Moving a card 320 inside a cluster of overlapping cards 320 will drag along the entire cluster of cards 320. A third option is to use multiple workspaces for the grouping of cards 320. A fourth option is to link cards 320 to an entire card arrangement. A mouse-click onto such a card 320 will then open another workspace view 300 and display the card arrangement. Further details on contents and layout of cards 320 will be explained shortly.

The news server 152 produces (i.e. provides information feeds for) the news view 305 to allow users 108 to collect cards 320 for addition to the workspace view 300. Cards 320 in the news view 305 represent information from a variety of other information sources. An analogy of the news view 305 is a "news stand" in which recent or periodic information is available. In one configuration, the news view 305 displays the contents cards 320 from news servers 151 that may be distributed through the network 101 within one of more computer systems 110. Cards 320 in the news view 305 can be organized by time and information sources (e.g., by topic or content area) as well as by geographic locations associated with the information represented by each card 320. Users 108 are able to copy cards 320 between the workspace view 300 and the news views 305. Cards 320 copied from the news view 305 to the workspace view 300 may be static and not change in content, or such cards 320 may dynamically adapt to modifications in content so that as the information source associated with a card 320 produces new information.

In one configuration, the system can display cards in various arrangements within the news view 305. In particular, the news view 305 can display a timeline arrangement of cards 320. The timeline arrangement provides a visualization that represents and organizes knowledge using a grid comprising of a timeline categorization for Cards on the horizontal axis and subject categorization on the vertical axis. In an alternative configuration, the new server 152 can display a map arrangement that provides a visualization that represents and organizes knowledge using a world-map or a floor plan comprising of geographical categorization for Cards. As an example, a news view can organize and arrange cards in an ordered list or as a table with rows and columns of cards organized horizontally by time and vertically by information sources. In such a configuration, new cards for newly discovered information can be inserted on the left pushing existing cards to the right. The time scale can be irregular and optimized to display the largest number of cards possible. The rows of cards in the news view can automatically expand and contract depending on the number of cards to be shown in each row.

In this manner, the system disclosed herein provides a novel process for information retrieval and processing based on information collection support. In one example, the news view 305 displays incoming information in cards 320 from selected information sources. The users 108 can copy relevant information from the news view 305 to the workspace view 300 or can create new information directly in the workspace view 300 by creating new cards. The user(s) 108 can study, organize, and categorize the information on the workspace view 300. In one configuration, if the workspace view is connected to a server then all content and established relations are made accessible to this server. The user can use two workspace views if he wishes to separate between information that is public and private. Other users 108 view the information on the news, database or exchange views 395, 310 and 315 and can also copy relevant information from the news, database, and exchange views 305, 310, and 315 to their personal workspace views 300. The system can track and analyze this movement of information from source to destination and can use this card usage and movement data based on user identifiers, locations of cards, arrangements of cards, contents of cards, times of movement and copying, and other such information in processing algorithms to infer or identify relationships between cards and to suggest other cards that reference other information that may be of interest to a user.

The news view 305 provides users 108 with the technology to effectively monitor and visualize additions and modifications from information sources such as web sites, databases, security cameras, alarm systems, sensors, news feeds and so forth. Every information item is displayed as a card 320. In one configuration, the news view 305 can organize and arrange cards 320 in an ordered list or as a table with rows and columns of cards 320 organized horizontally by time and vertically by information sources, such as by geographic origination or relation of the new story associated with the card 320. In another configuration, the news view has several visualization options such as displaying the card arrangement in a table or displaying the card arrangement on a geographic map. In one configuration, new cards 320 for newly discovered information can be inserted on the left in an appropriate row pushing existing cards 320 to the right. The time scale can be irregular and optimized to display the largest number of cards 320 possible. The rows of cards 320 in the news view 305 can automatically expand and contract depending on the number of cards 320 to be shown.

The news view 305 offers a variety of tools for the exploration and collaborative use of information. As an example, a user 108 can copy cards 320 from the news view 305 to the workspace view 300 thus allowing users to easily collect, compare and organize new information. Cards 320 copied from the news view 305 to the workspace view 300 may be static or dynamic as noted above. A static card 320 is an exact copy of the card on the news view 305. In one configuration, a dynamic card 320 continuously updates itself to reflect the most recent (left-most) card on the news view row it was copied from.

Figure 3:
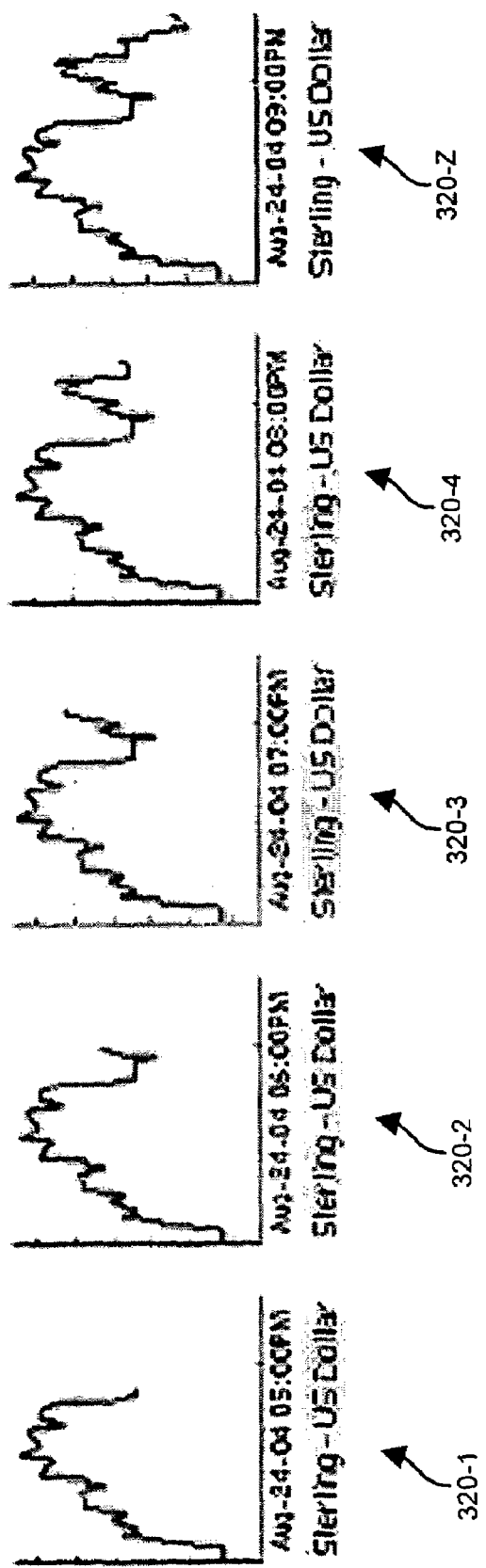
FIG. 3 is an example of how a dynamic card can change its representation within a graphical user interface as the information associated with that card changes in accordance with embodiments disclosed herein.

FIG. 3 provides an example of a how a dynamic card 320 can modify its icon area view and date/time bar 324 as its related information content transitions as shown in card views 320-1 through 320-Z. In this example, the card is showing a graph that evolves over time. It is to be understood that any information that can change can be shown in the icon area 321 of a card 320 in any view 300, 305, 310 or 315. For example, a news view row might inform about the weather in a particular region via a weather map in the icon area 321. A dynamic card on the workspace view 300 that is linked to this news view row would always display the most current weather report. Users 108 can also manually insert cards onto the news view to share information with other users. For example, analysts 108 could post cards 320 onto a news view 305 for planners 108 at other computers 110 to stay current about project or mission-relevant information. Additionally, the user 108 can instruct the news server 152 to filter information shown in news cards 320. As an example, the news view can have rows of cards that can be filtered for specific keywords or for content related to a specific geographic location. For example, a row displaying news about Iraq could be filtered for the words Hussein and Baghdad. The news view 305 can either highlight cards 320 that contain these keywords or exclude cards that do not contain these keywords.

Returning attention back to FIG. 1, the exchange server 153 produces the exchange view 315 to display cards 320 that are concurrently displayed in one or more workspace views 300 of at least one other user 108. The exchange view 315 can display cards 320 in prioritized order, or alternatively can display cards 320 the way they are arranged on another users workspace. This allows users 108 to view each other's workspaces 300 as they appear to those other users 108. The exchange server 153 and exchange view 315 thus support a collaborative or distributed work environment by allowing, for example, a user 108-1 to see and access cards 320 contained within workspace views 300 in the other user's graphical user interfaces 132-2 through 132-N. The exchange server 152 manages the display and exchange of card information between exchange views 315 and can include filter features to allow a user 108 to only see cards from selected users 108 (as opposed to all cards in all workspaces 300 of all users 108). The exchange server 152 can also provide security services to allow display of cards 320 to one user 108 only from other users that have granted access to those cards, or only from those other users 108 at a similar security level as the user 108 viewing the exchange view 310. In one configuration, the exchange view 315 can display cards of all other users in priority order or the cards of one user can be arranged in the same way as they are arranged on the workspace view of that user.

In this manner, the system disclosed herein provides a novel process for exchanging information and for asynchronous, decentralized, remote, and cross-organizational collaboration. In particular, users 108 use their individual workspace views 300 to organize and analyze information. The exchange view 315 displays (in prioritized order in one configuration) the cards 320 created by all collaborating users 108 (or those with the appropriate access permissions or security levels). The users 108 can copy relevant cards 320 from their exchange views 315 to their workspace views 300. Users 108 can take "ownership" over cards 320 copied from their exchange views 315 and these cards 320 are now modifiable by the user 108. In one configuration, when a user takes ownership of a card 320, the card 320 is no longer synchronized with a counterpart card on the card author's workspace view. In another configuration, once a card 320 is owned exclusively by a user 108, these cards 320 can no longer be used for collaboration such as by "instant messaging," card commenting, or "card voting."

The relation manager 150 also includes a database server 154 that displays a database view 310. The database view 315 displays cards 320 produced as a result of application of relation detection, interpretation and transformation algorithms 155 to card records 160 maintained within a card database 125. The card database 125 is shown externally from the computer system 110 since the card database 125 in this example is distributed and accessible by multiple computer systems 110-1 through 110-N. In particular, the database server 154 can apply spatial relation algorithms 155 to identify spatial relations between cards 320 in the workspace view 300 using positional information associated with those cards 320.

As a specific example, using the workspace view 300, a user 108 can arrange the cards 320 in a manner that "makes sense" to that user 108. This might include, for example, placing cards 320 that have related information sources or other related meaning to that user nearby each other (e.g., side-by-side, or in a vertical, horizontal, or overlapping grouped arrangement). Embodiments of the invention are based on the observation that human users 108 often arrange related things together. This observation digitally carries into a computer system environment such as a workspace 300 or desktop of a user's workstation in which users often group icons or other graphical representations that represent related things together. As an example, on a typical user's desktop, icons representing work folders for a project are often arranged nearby each other and icons representing commonly used applications are also arranged in close spatial proximity to each other on the desktop. The relation manager 150 is able to analyze the spatial arrangement of the cards 320 as provided by the user 108 in the workspace view 300 in order to deduce or infer relations between the information sources associated with the cards 320. In response, the database server 154 can provides other cards based on matching card records 160 maintained in the card database 125 that may be of interest to that user based on the analysis of the spatial arrangement of the cards 320 on that user's workspace view 300. The database server 154 is thus capable of inventing or deriving additional relations 170 based on the analysis of previous relations. For example if card A is related to card B and card B is related to card C, then the database server 154 can decide to relate card A and C because the indirect relation suggests a partial correlation.

In this manner, the system disclosed herein provides a novel process for organizational knowledge management based on information merging. Users 108 use their individual workspace views 300 (or operating system desktops and file systems) to organize and analyze information. Additions to the workspace views of all users are collected in the card database 125. The database items including the relations 170 and the card records 160 are combined into one coherent network of cards using the relation processing algorithms 155. The number of relations 170 between individual cards 320 may differ and can indicate the "strength" or "importance" of a relation 170 (or its unimportance or weakness). Relations 170 in the database 125 may be complementary or conflicting, speculative or concrete. The database views 310 of individual users 108 display (in prioritized order) cards 320 available in the database (as records 160) that are related or relevant to the cards 320 on a user's workspace view 300 based on the relations discovered via application of the relation processing algorithms 155. The users 108 can copy relevant cards 320 from their database views 310 to their respective workspace views 300 and can, if they desire, take ownership over cards 320 copied from their database view 310. These copied cards 320 that a user "owns" are now modifiable by the user and are in one configuration are no longer synchronized with their counterparts in the database 125 (they are thus treated as a new card and a new card record 160 is created). Depending upon the configuration, the database may not only collect cards 320 from the workspace view 300 of users 108, but also from the news view 305 (produced from the news server 152) and from files from the computer desktop and file directories of users 108.

Figure 4:
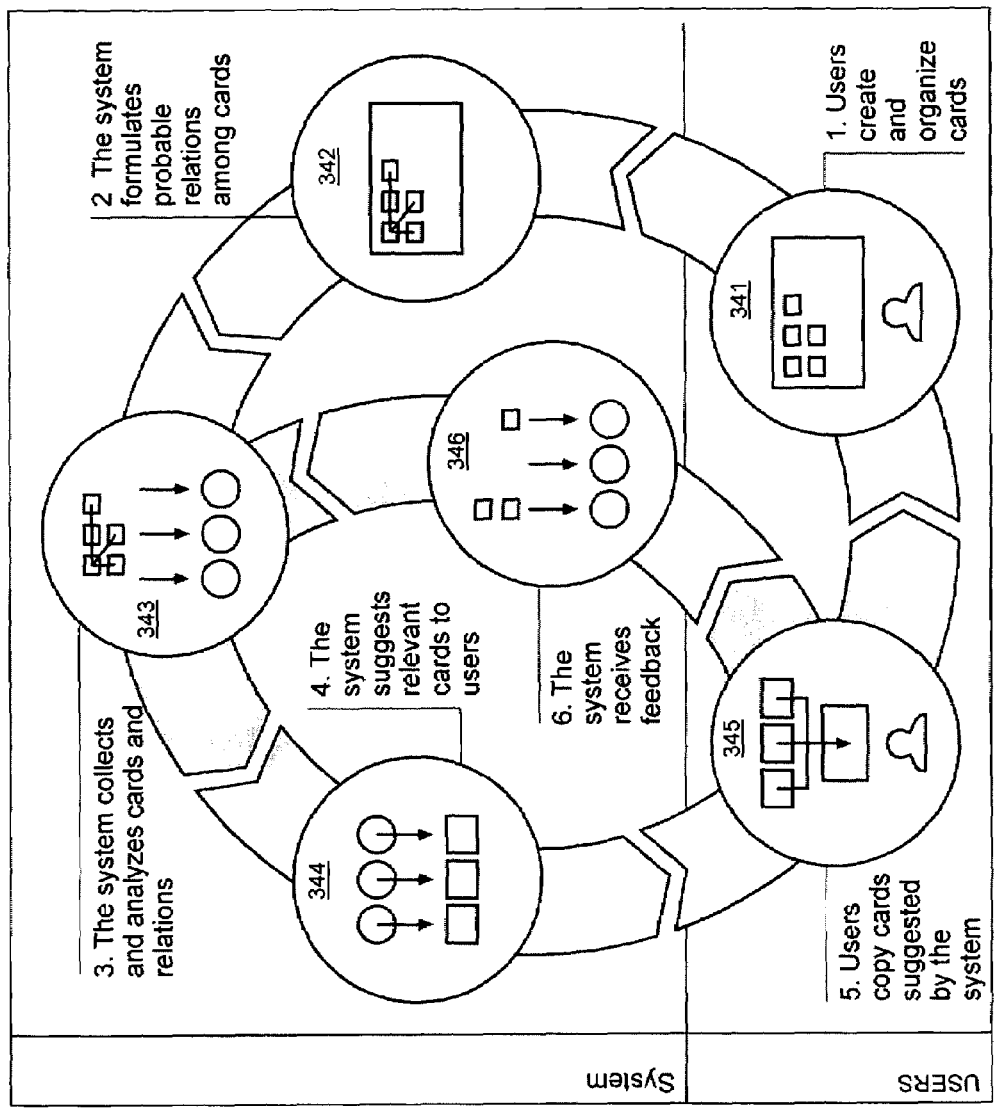
FIG. 4 is a diagram of information flow using cards processed by the relation manager 150 in accordance with one example embodiment disclosed herein.

FIG. 4 diagrams the overall information flow using cards 320 processed by the relation manager 150 in accordance with one example configuration.

The process begins at step 341 in the lower right corner of the diagram in which a user 108 creates and organizes cards 320 within his or her workspace view 300.

Moving upwards, in step 342 the relation manager 150 formulates probable relations among the cards 320 within workspace view 300 of the user 108. The relation manager 150 can store the relations 170 between cards 320 in the card database 125. In one configuration, the relations 170 between cards 320 are based on spatial relations between the cards 320 as defined by the physical (i.e., visual) arrangement of cards 320 on the workspace 300. As an example, relations can be detected, analyzed and maintained for horizontal card relationships, vertical card relationships, proximal card relationships, overlapping (fully or partial) card relationships, card size relationships, and other relationships between cards 320 as they may exist within the workspace 300. Each card record 160 can include a relationship weight or score in relation to all other card records 160 for other cards 320 within the workspace 300. Alternatively, a matrix or table can store the weights for the various types of relationships between the combinations of card pairs. Relationships computations for each particular relationship category between a pair of cards 320 can indicate how strong or weak that type of relationship is for those cards. As an example, two cards are arranged horizontally with each other and that are in close proximity to each other can have a high relationship scores for both horizontal and proximal relationship indicators 170 stored within the card records 160 for those cards 320 in the card database 125.

Next, at the top of the diagram, in step 343 the relation manager 150 analyzes card records 160 and card relations 170 within the card database 125. The results of this analysis can produce an indication of other card records 160 in the card database 125 that correspond to other cards 320 that are not currently displayed in the workspace view 300 of the user 108, but that might be of interest to that user operating that workspace view 300. A transformation algorithm 155 that can, for example, compare the combination of spatial relationships 170 that identify closely placed cards 320 in the workspace view 300. For those cards 320 that are close to each other, the transformation algorithm 155 can compare the content of those cards (i.e., can compare the information sources referenced by these cards) to identify a common subject. Alternatively, the transformation algorithm 155 can compare the creation time of closely spaced cards. In another alternative, the transformation algorithm 155 can compare user identities of users 108 who have accessed these cards. Using these metrics (e.g. a common creation time window, or a common subject, common users or use patterns), the transformation algorithm 155 can identify, in order of relevance, a set of resultant cards not already placed in that user's workspace 300. These can be shown to the user in the database view 310. Additionally, the current arrangement of exchange view cards 320 can be reordered to reflect the newly discovered relations of the group of cards so that cards of other users that might be of importance to the user (that are already in the exchange view) are more to the front of the line or list in the exchange view to be more noticeable to that user. In one configuration, cards 320 displayed on views not only hint relevant information but also inform about people (the authors of the cards) with relevant knowledge on a particular topic. This can foster the creation of teams or communities of interest and help to build knowledge-based relationships between people due to information objects those people spatially organize in particular ways.

As another example, suppose the first user 108 has a workspace view 300 containing three cards 320 that are each closely spaced to one other and are aligned either vertically or horizontally. Information sources associated with each of these cards may be, for example, weather-related information concerning a particular geographic location. The relation manager 150 can analyze the spatial relationships and close proximity of these cards to identify a strong relation between the geographic area identified by one of the cards with weather-related information associated with the other cards. At any point in time, if another user creates a new card 320 containing a story about a weather-related incident happening within the geographic region of interest to the first user 108, since the relation manager 150 has already identified the strong relation 170 between the first group of cards and in the first users workspace 300, the relation manager 150 can identify the card records 160 associated with the other user's card(s) concerning the story of the weather-related event within the same geographic location and can display a copy of the card 320 within the database view 310 to the first user 108 in order to indicate to the first user that another card record 160 exists within the card database 125 that may be of interest to the first user.

If a user copies a card from a view into his or her workspace view, in one configuration the card can adopt modifications from the original card stored on the workspace views of other users, in the database, or in other news sources. In this manner, cards can be updated to contain modifications made elsewhere (e.g. on other user's workspace views, in a database or on a web site).

In step 344, on the left side of the diagram in FIG. 4, the relation manager 150 suggests or displays other relevant cards that may be of interest to the user 108. Using the example above, the relation manager 150 can display these other cards within the database view 310 in order to identify information referenced by card records 160 in the database 125 that the user 108 may have an interest in. This processing is possible based on the analysis of the spatial relations between card records associated with cards 320 the workspace view 300 of each user 108.

Next, in step 345, the user 108 copies cards 320 suggested by the relation manager 150 from the views 305, 310 or 315 (displayed within the database view 310 in the example above) for use within the workspace 300. In step 345, when the user copies cards 320 from another view into the workspace view 300, that action implicitly defines new spatial relationships with any existing cards 320 in the workspace view due to the placement of the copied card 320 into the workspace 300. In other words, as the user 108 brings cards into and out of the workspace view 300, the spatial relations between cards in that view 300 are constantly changing. Additionally, relations between cards 320 can be static or permanent or may be dynamic and exist only for a limited amount of time. The relation manager 150 can continuously identify, analyze and re-evaluate the relations 170 in order to identify other cards 320 that may be of interest to that user based on the spatial analysis of the current group of cards 320 within the workspace view 300 of that user 108.

In step 346, the relation manager 150 can receive feedback about the relations 170 that were detected and analyzed in steps 342 and 343 by tracking which cards 320 are selected for use by the user 108, as suggested by the relation manager 150. In other words, in one configuration, the relation manager 150 can track which cards 320 suggested to the user 108 are selected for use by that user 108 and can use this feedback as additional information to strengthen or weaken relationships 170 maintained within the card database 125. The system thus improves itself by observing whether people copy cards 320 suggested by the system (positive feedback if they do) and by observing where people copy cards (e.g., cards copied from the left of the a list in the news view 305 are assumed to be more relevant and subsequently produce a more positive feedback).

From this high-level overview, is to be understood that embodiments of the invention are able to spatially analyze the arrangement of cards 320 (or any graphical objects) within a workspace or other area defined by a user and from this analysis, can identify and suggest or group that other information that may be of interest to the user. The remaining flowcharts and figures will now provide a description of how the relation manager 150 operates in accordance with example embodiments in order to perform the overall processing explained above.

Figure 5:
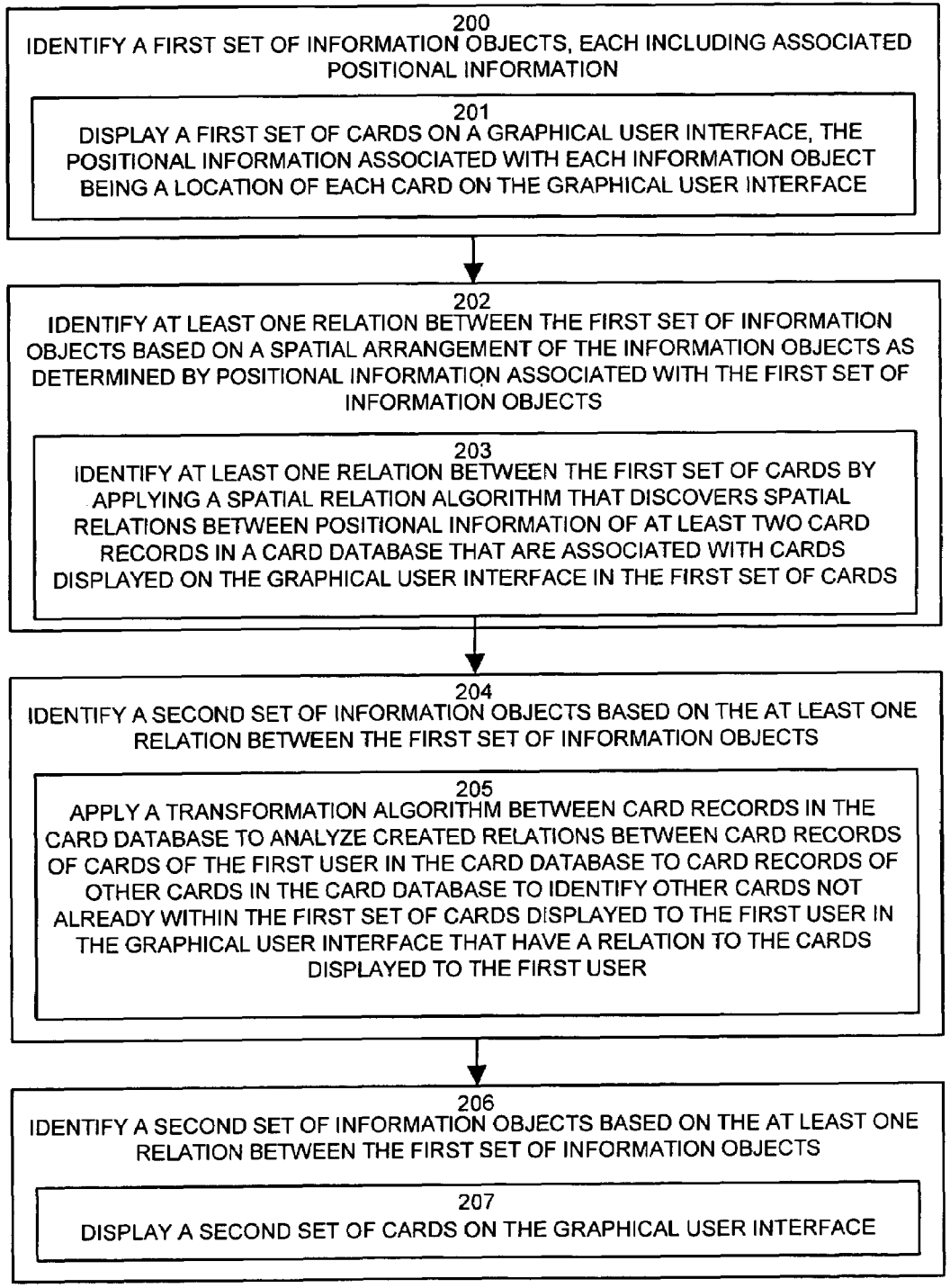
FIG. 5 is a flow chart of processing steps that the relation manager performs to identify information based on relations in accordance with embodiments disclosed herein.

FIG. 5 is a flow chart of processing steps that the relation manager 150 performs to identify information based on relations in accordance with embodiments disclosed herein.

In step 200, the relation manager 150 identifies a first set of information objects (e.g., cards 320, or any other item that the system tracks using positional relations and positional information) that each includes associated positional information (e.g., a position and/or size within a graphical user interface 132).

In sub-step 201, the relation manager 150 displays a first set of cards 320 on a graphical user interface (e.g., in response to a user 108 creating or copying cards 320 into the workspace view 300). The positional information associated with each information object in the embodiments that uses cards is a location of each card on the graphical user interface 132.

In step 202, the relation manager 150 identifies at least one relation between the first set of information objects based on a spatial arrangement of the information objects as determined by positional information associated with the first set of information objects. Sub-step 203 shows details of this in configurations that use cards 320.

In sub-step 203, the relation manager 150 identifies at least one relation 170 between the first set of cards by applying a spatial relation algorithm 155 that discovers spatial relations 270 using positional information of at least two card records 160 in the card database 125 that are associated with cards 320 displayed on the graphical user interface in the first set of cards (e.g., in the workspace view 300).

In step 204, the relation manager 150 identifies a second set of information objects (e.g., other cards 320) based on the relation(s) between the first set of information objects. In configurations that use cards, the second set of information objects is a second set of cards, such as those in the news view 305, the database view 310 or the exchange view 315, that are identified as being of interest to a user based on the identified relations (e.g., spatial and/or contextual) of the users workspace view cards 320.

In sub-step 205, the relation manager 150 applies a transformation algorithm 155 between card records 160 in the card database to analyze created relations 170 between card records 160 of cards 320 of the first user (e.g., 108-1) in the card database 125 to card records 160 of other cards 320 in the card database (e.g., of other users 108-2 through 108-N). This processing identifies other cards 320 (e.g., a second set) not already within the first set of cards displayed to the first user 108-1 in the graphical user interface 132-1 that have a relation to the cards 320 displayed to the first user.

In step 206, the relation manager 150 outputs an identity of the second set of information objects. Such output can be to any type of output device such as a display device (e.g., a computer monitor or printer) or to a file for subsequent processing. Sub-step 206 shows details of this in configurations that use cards 320.

In sub-step 207, the relation manager 150 in one configuration displays a second set of cards on the graphical user interface. Those cards can be shown, for example, within the database view 310 to indicate other cards in the card database 125 that may be of interest to the user 108. Thus in step 207, the relation manager (the database server in this example) displays the other cards not already within the first set of cards displayed to the first user in the graphical user interface that have a relation to the cards displayed to the first user.

As an example of the aforementioned processing, the second set of cards can be an arrangement (e.g., a list) of cards 320 in the database or exchange view that are arranged in order of importance based on the relations discovered from the analysis of the placement of cards 320 within the user's workspace view 300. If there were several cards 320 located nearby each other (e.g., aligned horizontally, vertically, or in a group such as overlapping), and that were all related to a similar topic, or that all were created within a similar timeframe, the relation manager 150 can apply relation detection algorithms to detect the combination of position (cards being located nearby each other) and other relationship factors (e.g., created around the same time, or referencing similar information) to identify a close relation between these the users workspace cards 320 and other card records in the card database 125. The relation manager 150 can traverse cards records 160 in the card database 125 looking for card records 160, for example, that reference information of a similar topic and that were created around the same time. From this, the relation manager 150 can infer that these other card records 160 may reference information of importance to the user 108. In response, the relation manager 150 can display and arrange relevant card records 320 in the database or exchange view for recent news stories that might be of interest to the user 108.

As another example, suppose a first user copies a card that exists on a second user's workspace view (available to the first user via the exchange view) and places this card copy nearby a group of cards on the workspace view of that first user. In response, the relation manager 150 using relation detection algorithms 155 might identify, to the second user in that second user's database view 310, the identity of those other cards in the nearby group of cards on the first user's workspace view 300, since the first user placed the copied card nearby those other cards. The first user may have done this since the first user intuitively saw meaning between the group of existing cards and the copied card (and as a result placed the copied card from the second user nearby, such as overlapping, the existing group of cards). In this manner, the intuition used by the first user of making the copied card now become part of the existing group (because he or she felt a need to relate them spatially) is passed to the second user and the pre-existing cards that were grouped on the first users workspace view can be shown in the database view as being cards that now may be of interest to the second user. The system disclosed herein thus allows human intuition, expressed through spatial arrangements of objects, to be analyzed and passed to other users by exposing cards to another user or users that might be of interest to that person(s) based on spatial relations or arrangement of objects defined by that user, or by other users. Further processing details of the relation manager in accordance with various configurations as explained herein will now be provided with the flow chart of processing steps on FIG. 6.

Figure 6:
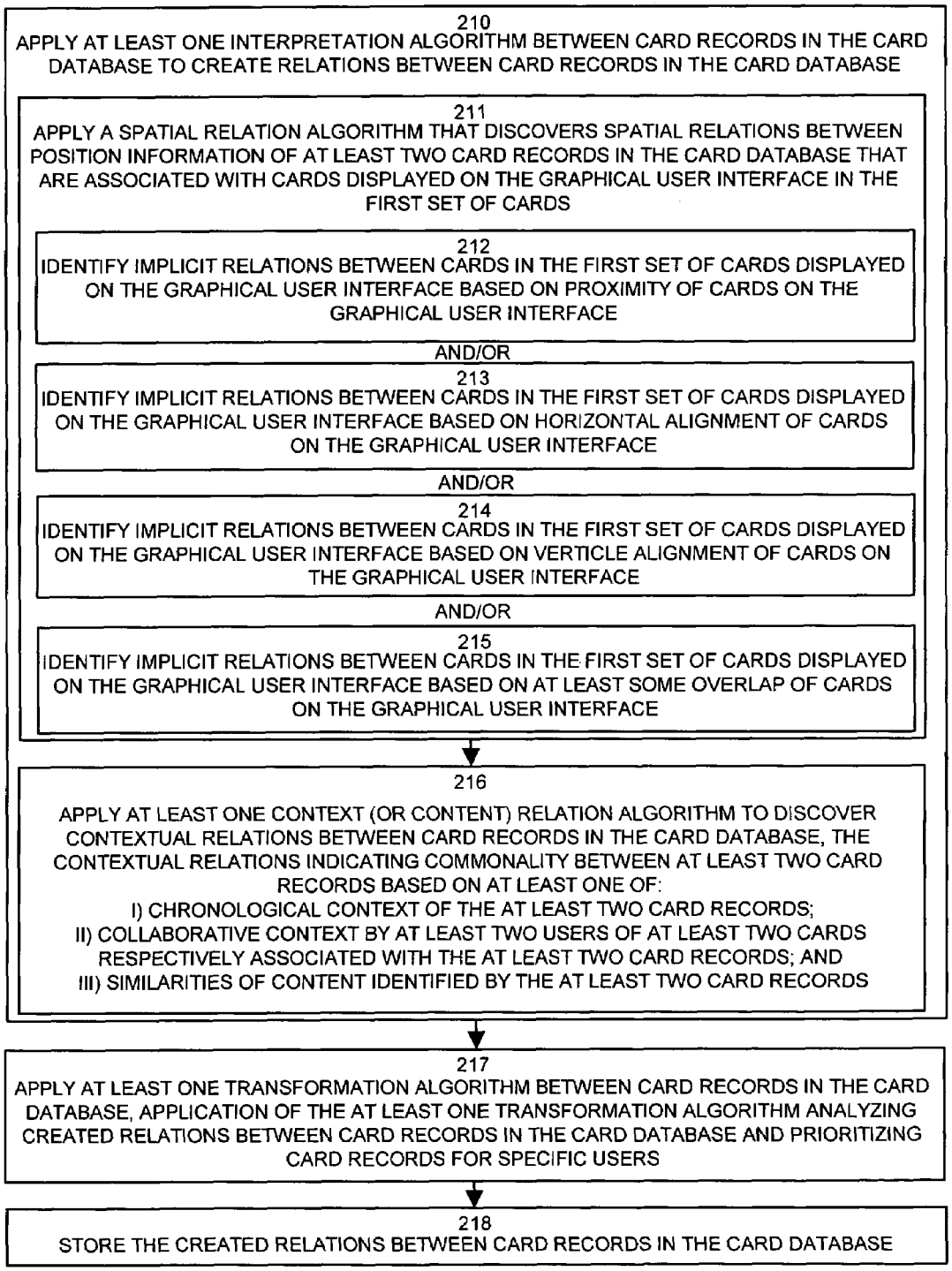
FIG. 6 is a flow chart of processing steps that the relation manager performs to identify relations between cards having respective card records in a card database.

FIG. 6 is a diagram that shows processing that the relation manager 150 performs to identify relations 170 between cards 320 having respective card records 160 in the card database 125.

In step 210, the relation manager 150 applies at least one interpretation algorithm 155 between card records 160 in the card database 125 to create relations 170 between card records 160 in the card database 125. Sub-steps 211 through 216 show details of this processing.

In step 211, the relation manager 150 applies a spatial relation algorithm 155 that discovers spatial relations 170 between position information of at least two card records 160 in the card database 125 that are associated with cards 320 displayed on the graphical user interface 132 in the first set of cards. Examples of spatial relation algorithms are shown in sub-steps 212 through 215.

In step 212, the relation manager 150 identifies implicit relations between cards in the first set of cards displayed on the graphical user interface based on proximity of cards on the graphical user interface. Thus, how close or far apart cards are can determine a strength or week relationship between cards 320.

In step 213, the relation manager 150 identifies implicit relations between cards in the first set of cards displayed on the graphical user interface based on horizontal alignment of cards 320 on the graphical user interface 132. Horizontal alignment can be suggestive of a list of items and transformation algorithms 155 can perform analysis of cards 320 arranged horizontally to suggest other cards that might be successor cards in the list.

In step 214, the relation manager 150 identifying implicit relations between cards in the first set of cards displayed on the graphical user interface based on vertical alignment of cards on the graphical user interface. Likewise, vertical arrangements of cards 320 might also be suggestive of a card list.

In step 215, the relation manager 150 identifying implicit relations between cards in the first set of cards displayed on the graphical user interface based on at least some overlap of cards on the graphical user interface. Overlapping cards can suggest a grouping relationship.

It is to be understood that the spatial relations noted above are not limited to vertical, horizontal and overlap. Other spatial relations can exist and be analyzed as well, such as relative size relations between cards, or exclusive (i.e. alone) or particular placement (e.g. in a certain corner, in center, etc.) of cards 320 in certain regions within the graphical user interface 132. Additionally, spatial processing algorithms can recognize card clusters that define groups of cards in close proximity to one another that create a cluster that is distinct from other clusters of other cards 320.

The relation manager can detect and analyze other relations as well besides spatial relations. As an example, context relations concerning use, access (e.g. copying) or other operations on cards can be detected that are based on time of card creation or modification, which users access a card, and relation of content between cards that have similar or relating subject matter.

In step 216, the relation manager 150 applies at least one context relation interpretation algorithm 155 to discover contextual relations between card records 160 in the card database 125. The contextual relations 155 indicate commonality between at least two card records 160 based one or more relationship criteria. In one configuration, the relation manager 150 can detect and analyze chronological context of the at least two card records (e.g., sequence of creation or modification of card information). In another configuration, the relation manager 150 can detect and analyze collaborative context by at least two users 108 of at least two cards 320 respectively associated with the card records 160. An example of collaborative context is when two or more users share two (or more) cards such as by providing comments to those cards, or using instant messaging to discuss information associated with the cards, or via other common access (e.g., copying to workspace) to the cards by those two or more users. In another configuration, the relation manager 150 can detect and analyze similarities of content identified by the at least two card records using keyword or subject or title matching, for example. In this manner, using contextual relations, the relation manager 150 can determine, for example, that if user A and B use the same card then other cards used by user A and B are more likely to become related. Card content can include content displayed on the card, parameters associated with the card, or information content hyperlinked to the card or metadata about the card (e.g., creation time, time of last access, time of last copy, user access history, etc.) that might not be readily visible from viewing the cards in a view.

In one configuration, the database contents are evaluated based on the relations between cards. The relation manager 150 can thus establish relationships among cards 320 based on comparison of content and spatial history of card usage. Content relations are established based on a comparison of card contents such as headings, contents of hyperlinked files, and image descriptions, whereas context relations are established based on the spatial location of cards, the collaborative use of cards, or the virtual organization of cards (e.g. the hierarchical organization of files in computer directories). For example, two relations between two cards can be valued more than one relation between two cards. This is because two relations between two cards means that two different algorithms both established a relation between these two cards, although such relations may have been established for different reasons. The following is a list of example algorithms 155 that can be applied by the relation manager 150 to detect relations 170 between cards in accordance with one example embodiment of the invention:

Interpretation Algorithms: Algorithms that create relations.
    Level I Algorithms: algorithms that automatically recognize explicit relations in the spatial organization of Cards.
    Level II Algorithms: algorithms that automatically recognize implicit relations in the spatial organization of Cards.
    Level III Algorithms: algorithms that automatically recognize relations based on the history and collaborative use of Cards.
    Level IV Algorithms: algorithms that automatically recognize relations based on the existing structure of relations among of Cards.

Transformation Algorithms: algorithms that analyze relations and that prioritize Cards for specific users.
    News Algorithms: algorithms that automatically organizes cards by time, place, author, geographical location and content.
    Database Algorithms: algorithms that automatically prioritizes cards in a database.
    Exchange Algorithms: algorithms that automatically prioritizes cards on the workspace of multiple users.
    Visualization Algorithms: algorithms that automatically visualize (arrange) Cards The processing explained above of steps 210 through 216 creates relations 170 between card records 160 (and hence their respective cards 320). Once created, the relation manager 150 can analyze such relations 170 to identify other cards that may reference information of interest to users 108.

In step 217, the relation manager 150 applies at least one transformation algorithm 155 between card records 160 in the card database 125. Application of the transformation algorithm 155 analyzes created relations 170 between card records 160 in the card database and prioritizes card records 160 for specific users for displaying in specific views. As an example, if a transformation algorithm 155 detects a very strong relation due to overlapping spatial arrangement of a group of cards, and further determines that the overlapping group of cards reference information that was created around the same time period (or for a common geographic location for example), the relation manager 150 can use transformation algorithms 155 to identify other cards that were created around the same time and are related to the same topic.

In step 218, the relation manager 150 stores the created relations between card records 160 in the card database 125. As relationships between cards change, the changes can be reflected in the stored relations calculated by the relation manager 150 using periodic application of the relation processing algorithms 155. In one configuration, each time a user makes a change to his or her workspace view, the relation manager 150 can re-calculate relations to make a new determination of what cards are now of interest to the user 108.

Figure 7:
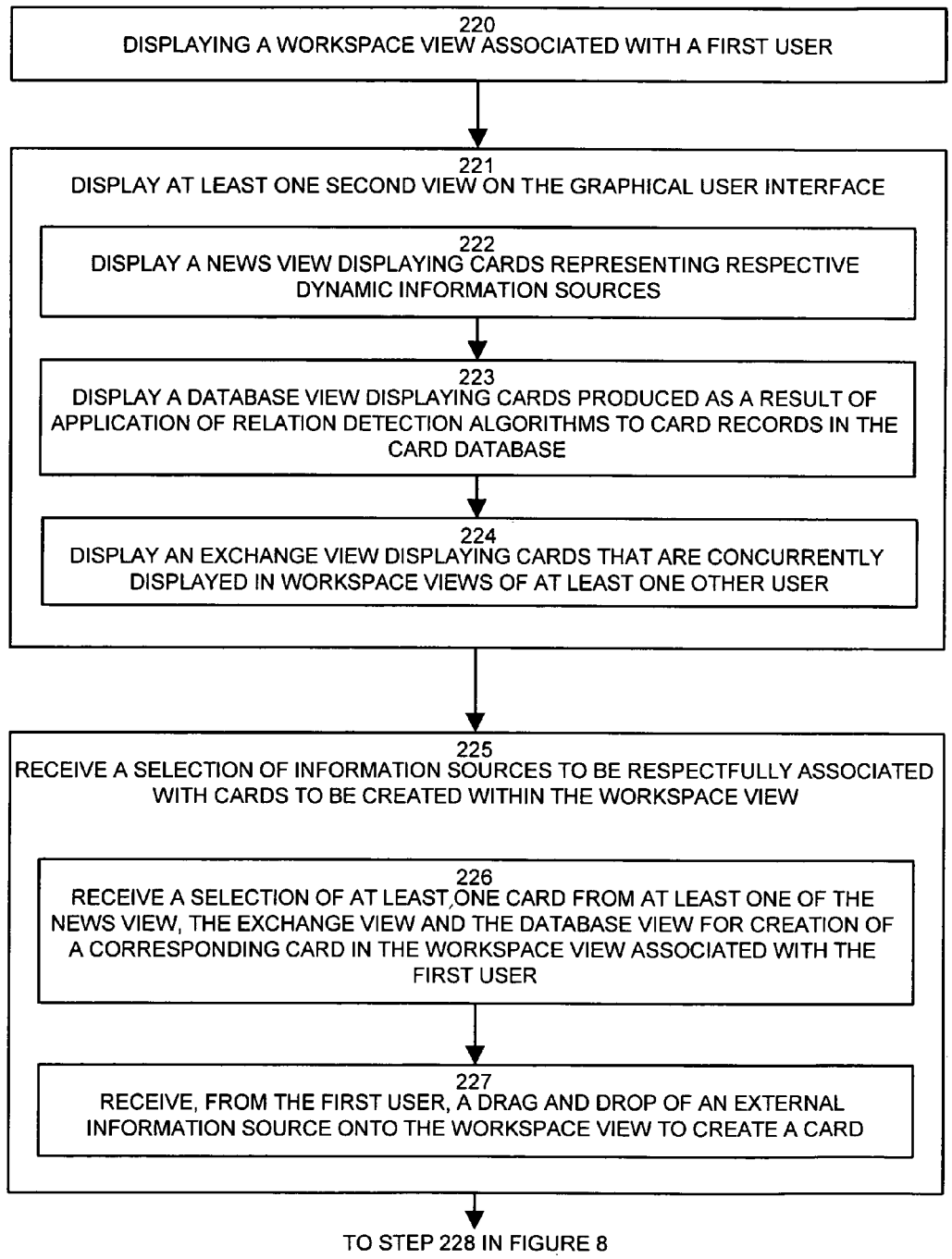
FIGS. 7, 8 and 9 are flow charts of processing steps that the relation manager performs to allow a user to create cards in a workspace in a spatial arrangement that is analyzed to identify other cards of interest that the user.
Figure 8:
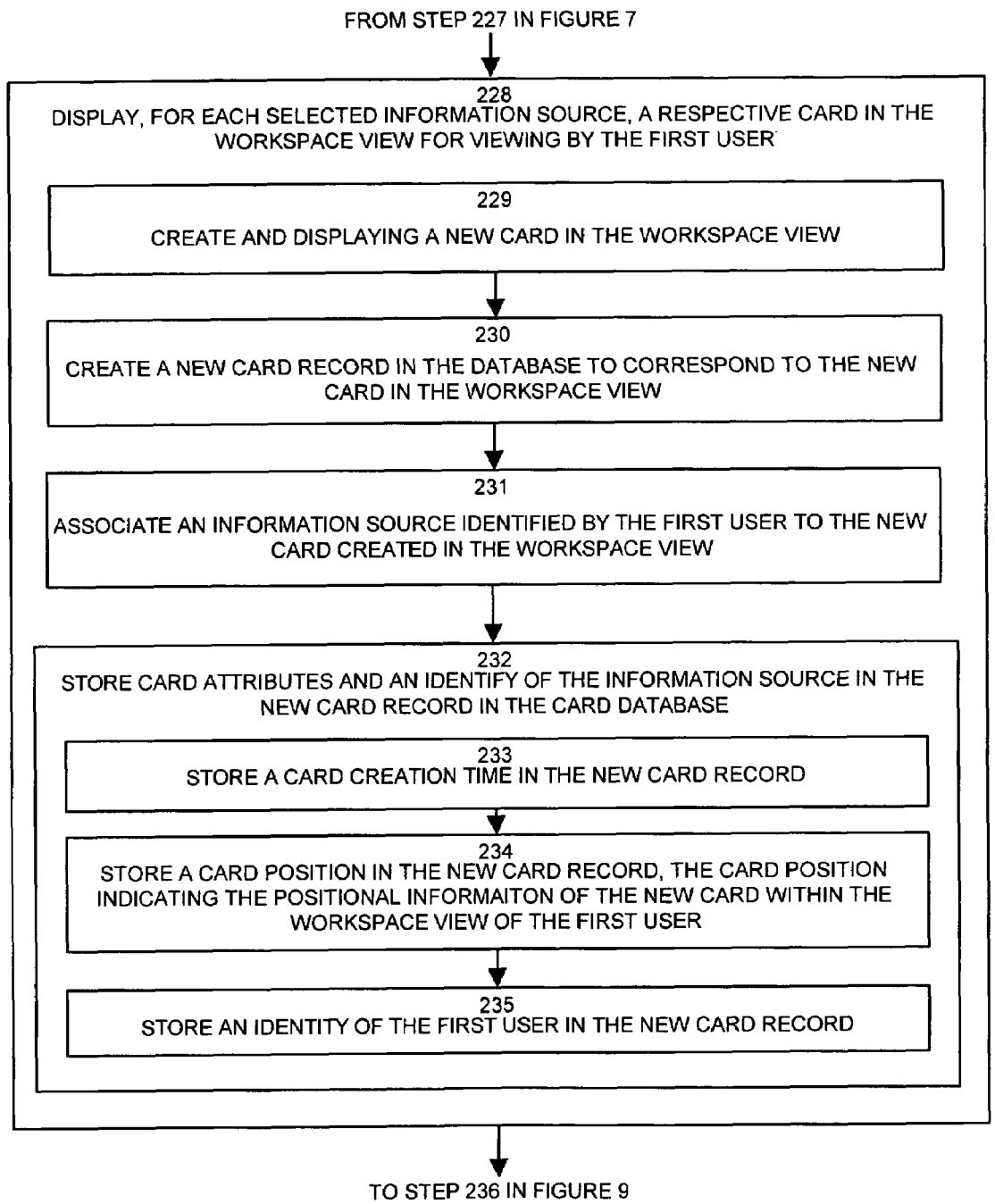
Figure 9:
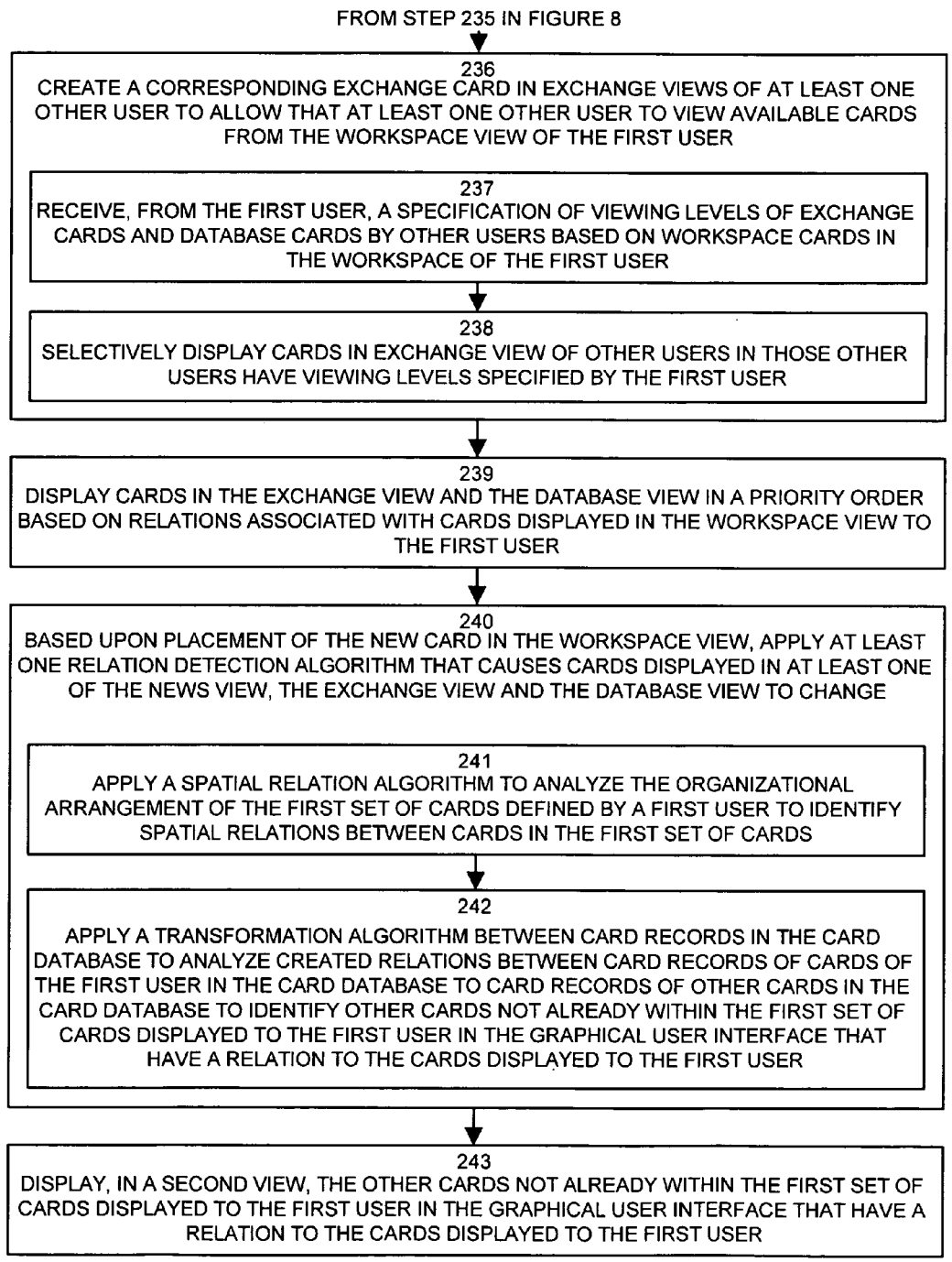

FIGS. 7, 8 and 9 are a single flow chart of processing steps that the relation manager 150 performs to carry out the processing operations to allow a user to create cards 320 in the workspace and to analyze spatial relations between the cards to suggest other information sources that may be of interest to that user.

In step 220, the relation manager 150 displays a workspace view associated with a first user 108-1.

In step 221, the relation manager 150 displays one or more other views 305, 310, 315 on the graphical user interface 132. Sub-steps 222 through 224 show details of this processing in accordance with one example configuration.

In step 222, the relation manager 150 displays a news view 305 displaying cards 320 representing respective dynamic information sources.

In step 223, the relation manager 150 displays a database view 310 displaying cards 320 produced as a result of application of relation detection algorithms 155 to card records 160 in the card database 125.

In step 224, the relation manager 150 displays an exchange view 315 displaying cards 320 that are concurrently displayed in workspace views 300 of at least one other user 108-2 through 108-N (FIG. 1).

In step 225, the relation manager 150 receives a selection of information sources to be respectfully associated with cards to be created within the workspace view 300. As discussed above, users 108 can either select cards from other views 305, 310 or 315 for inclusion into the workspace, or they can create new cards from scratch. In one configuration, the relation manager 150 can perform automatic creation of cards without user participation by analyzing a database of information. In this manner, entire databases can automatically be converted into cards. Sub-steps 226 and 227 show details of processing for user-based creation of cards in accordance with one example configuration.

In step 226, the relation manager 150 receives a selection of at least one card from the news view 305, the database view 310 or the exchange view 315 for creation of a corresponding card 320 in the workspace view 300 associated with the first user 108-1.

As an alternative to step 226, in step 227, the relation manager 150 receives, from the first user 108-1, a drag and drop of an external information source onto the workspace view to create a card. This can be, for example, a drag and drop of a desktop icon, URL, web page, or any other content onto the workspace.

Next, in step 228, the relation manager 150 displays, for each selected information source, a respective card 320 in the workspace view 300 for viewing by the first user 108-1.

Steps 229 through 235 show processing to allow a user 108 to create a new card 320 in the workspace view. Generally, cards can be manually created such as by creating a blank card and then specifying an information source to which that card refers. The card look can be complemented with a picture, explanatory text, a heading and other visual attributes by simply dragging and dropping pictures and text fragments onto the card. Alternatively, in another mode, cards can be semi-automatically created in a workspace view or on a desktop by dragging an information object such as hyperlink, document, file or URL onto the workspace view in which case a new card is automatically formed and associated with the hyperlinked data, file or document. The card picture and the card heading are added automatically if an appropriate picture and heading can be extracted from the dragged information object or if an appropriate picture can be found in a database that matches the file name or within some of the content of the dragged information object. In yet another mode, an automated card creation process can traverses a set of records or files, such as a database or file system or all web pages within a certain URL and can perform automatic creation of cards from each database record, web page, or file. As an example, entire databases or file systems or all documents below or within a certain URL or domain on the Internet can automatically be converted into cards using the semi-automatic creation of cards but in a non-manual way that does not require a user dragging and dropping of each file, document or URL onto a view. Below are steps a user 108 can perform to create a card.

In step 229, the relation manager 150 creates and displays a new card in the workspace view. The user 108 may have performed a drag and drop of some content onto the workspace view 300, or may have selected a pull down menu in the workspace view to create a new card 320.

In step 230, in response, the relation manager 150 creates a new card record 160 in the database to correspond to the new card in the workspace view 300.

In step 231, the relation manager 150 associates an information source identified by the first user to the new card 320 created in the workspace view. In the case of a drag and drop, the information source can be identified via the information dragged into the workspace view 300. If the user created a new card from pull down menu selection, the workspace view 300 can prompt the user to specify a specific information source (that can be hyperlinked or embedded) such as a file system path and filename, a URL or some other indicator.

In step 232, the relation manager 150 stores card attributes and an identity of the information source in the new card record 160 in the card database. Sub-steps 233 through 235 show details of this processing.

In step 233, the relation manager 150 stores a card creation time in the new card record.

In step 234, the relation manager 150 stores a card position in the new card record 160. The card position indicates positional information such as a corner pixel location (or a hierarchical location such as a specific window, directory, or desktop) as well as a window size of the new card 320 within the workspace view 300 of the first user 108.

In step 235, the relation manager 150 stores an identity of the first user in the new card record 160. The user for a new card becomes the author of that card 320. Once a card 320 is created, pictures and text can be dragged and dropped onto the icon area and text can be dragged and dropped on the heading bar of the card to cause those areas to automatically change.

In this manner, a user 108 can create a card by simply dragging a hyperlink or file or other digital material onto the workspace view 300. A new card 320 is created where the hyperlink or file is dropped, a picture is added automatically (by searching the hyperlink destination or the file contents for an appropriate graphic), the heading is added automatically (usually the web site or file name), and a link or embedded attachment is automatically created from the file or the web site reference by the hyperlink Steps 236 through 239 relate to processing that occurs after the card 320 is created in the workspace view 320.

In step 236, the relation manager 150 creates a corresponding card 320 in exchange views 315 of at least one other user 108-2 through 108-N to allow that other user to view available cards 320 from the workspace view of the first user 108-1. Sub-steps 237 and 238 show details of this processing in accordance with one example configuration.

In step 237, the relation manager 150 receives, from the first user, a specification of viewing levels of cards in the exchange view 315 and cards in the database view 310 by other users 108 based on cards in the workspace view 300 of the first user 108-1. This allows a user 108 to set security or privilege levels for access to cards.

In step 238, the relation manager 150 selectively displays cards 320 in exchange views 315 of other users 108-2 through 108-N if those other users have viewing levels specified by the first user 108-1. In other words, if the other users have the correct permission, they will be able to see the newly created cards from the first users 108-1 workspace view 300.

In step 239, the relation manager 150 displays cards 320 in the exchange view 315 and the database view 310 in a priority order based on relations associated with cards displayed in the workspace view to the first user. This allows cards that have been identified as possibly most interesting to the user 108 to be displayed first in a list in the database and exchange views.

In step 240, the relation manager 150, based upon placement of the new card in the workspace view, applies at least one relation detection algorithm 155 that causes cards 320 displayed in the news view 305, the exchange view 315 and the database view 310 to change in position (or for example disappear from the database view 310 if no longer deemed relevant).

In step 241, the relation manager 150 applies a spatial relation algorithm 155 to analyze the organizational arrangement of the first set of cards defined by a first user to identify spatial relations 170 between cards in the first set of cards in that users workspace view 300. Such processing has been explained in several examples above.

Once relations 170 are identified, in step 242, the relation manager 150 applies a transformation algorithm 155 between card records 160 in the card database 125 to analyze created relations 170 between card records 160 of cards 320 of the first user in the card database 125 to card records of other cards in the card database (e.g., of other users) to identify other cards not already within the first set of cards displayed to the first user 108-1 in the graphical user interface 132-1 that have a relation to the cards displayed to the first user.

Next, in step 243, the relation manager 150 displays, in a second view such as the database view 310, the other cards not already within the first set of cards displayed to the first user in the graphical user interface that have a relation to the cards displayed to the first user. In this manner, the system is able to indicate to the user 108-1 what other information that exists in the database that may be of interest to that user 108-1 via analysis of spatial relations between icons on that user's workspace view 300.

Relations between cards or other information objects can have different weights based on, for example, the number of relations between two information objects as compared to numbers of relations between other information objects, or based on what algorithm was used to compute or identify relations. As an example, in one configuration, the system identifies at least one relation between the first set of information objects by computing relations between at least two information objects and by computing one or more other relations between at least two other information objects. The system can identify a second set of information objects based on the relations between the first set of information objects by identifying that relations in the first set of relations are collectively stronger than relations in the second set of relations. As an example, the system can determine that a sum of the relations in the first set of relations is greater in comparison to a sum of the relations in the second set of relations. Alternatively, the algorithms used can determine a weight of relations. In such a case, the system can determine that at least one algorithm used to determine relations in the first set of relations is of greater weight than at least one algorithm used to determine relations in the second set of relations. Thus depending for example on a sum or relations, some spatial relations may be suggestive of stronger relations than others (e.g., horizontal versus diagonal).

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method for identifying information based on relations, the method comprising:
   identifying a first set of information objects, each including associated positional information, comprising displaying the first set of information objects on a graphical user interface, the positional information associated with each information object being a location of each information object on the graphical user interface;
   identifying at least one relation between the first set of information objects based on a spatial arrangement of the information objects as determined by positional information associated with the first set of information objects, wherein identifying at least one relation between the first set of information objects comprises:
      computing a first set of relations between at least two information objects;
      computing a second set of relations between at least two other information objects;
   identifying a second set of information objects based on the at least one relation between the first set of information objects, wherein identifying the second set of information objects based on the at least one relation between the first set of information objects comprises:
   identifying that relations in the first set of relations are collectively stronger than relations in the second set of relations; and
   outputting an identity of the second set of information objects comprising displaying the second set of information objects on the graphical user interface.

2. The method of claim 1 wherein the first set of information objects comprises a first set of cards:
   wherein identifying at least one relation between the first set of information objects comprises:
      identifying at least one relation between the first set of cards by applying a spatial relation algorithm that discovers spatial relations between positional information of at least two card records in a card database that are associated with cards displayed on the graphical user interface in the first set of cards; and
   wherein the second set of information objects is a second set of cards.

3. The method of claim 2 comprising:
   maintaining the card database containing respective card records associated with a plurality of cards associated with a plurality of users, each card record including an identification of card content associated with the card record, the plurality of cards including the first set of cards and the second set of cards; and
   the database maintaining a respective card record for each card in the first set of cards and the second set of cards.

4. The method of claim 2 comprising:
applying at least one interpretation algorithm between card records in the card database to create relations between card records in the card database; and
storing the created relations between card records in the card database.

5. The method of claim 2 wherein applying the spatial relation algorithm that discovers spatial relations between position information of at least two card records in the card database that are associated with cards displayed on the graphical user interface in the first set of cards comprises:
identifying implicit relations between cards in the first set of cards displayed on the graphical user interface based on proximity of cards on the graphical user interface.

6. The method of claim 2 wherein applying the spatial relation algorithm that discovers spatial relations between position information of at least two card records in the card database that are associated with cards displayed on the graphical user interface in the first set of cards comprises:
identifying implicit relations between cards in the first set of cards displayed on the graphical user interface based on horizontal alignment of cards on the graphical user interface.

7. The method of claim 2 wherein applying the spatial relation algorithm that discovers spatial relations between position information of at least two card records in the card database that are associated with cards displayed on the graphical user interface in the first set of cards comprises:
identifying implicit relations between cards in the first set of cards displayed on the graphical user interface based on vertical alignment of cards on the graphical user interface.

8. The method of claim 2 wherein applying the spatial relation algorithm that discovers spatial relations between position information of at least two card records in the card database that are associated with cards displayed on the graphical user interface in the first set of cards comprises:
identifying implicit relations between cards in the first set of cards displayed on the graphical user interface based on at least some overlap of cards on the graphical user interface.

9. The method of claim 4 applying at least one interpretation algorithm between card records in the database to create relations between card records in the card database comprises:
applying at least one relation algorithm to discover contextual relations between card records in the card database, the contextual relations indicating commonality between at least two card records based on at least one of:
i) chronological context of the at least two card records;
ii) collaborative context based on access by at least two users of at least two cards respectively associated with the at least two card records; and
iii) similarities of content identified by the at least two card records.

10. The method of claim 4 wherein identifying a second set of cards based on at least one relation between the first set of cards comprises:
applying at least one transformation algorithm between card records in the card database, application of the at least one transformation algorithm analyzing created relations between card records in the card database and prioritizing card records for specific users.

11. The method of claim 10 wherein displaying the first set of cards on a graphical user interface comprises:
displaying a workspace view associated with a first user;
receiving a selection of information sources to be respectfully associated with cards to be created within the workspace view; and
displaying, for each selected information source, a respective card in the workspace view for viewing by the first user.

12. The method of claim 11 comprising:
displaying at least one second view on the graphical user interface, the second view being at least one of:
i) a news view displaying cards representing respective dynamic information sources;
ii) an exchange view displaying cards that are concurrently displayed in workspace views of at least one other user; and
iii) a database view displaying cards produced as a result of application of relation detection algorithms to card records in the card database.

13. The method of claim 12 wherein receiving the selection of information sources to be respectfully associated with cards to be created within the workspace view comprises:
receiving a selection of at least one card from at least one of the news view, the exchange view and the database view for creation of a corresponding card in the workspace view associated with the first user.

14. The method of claim 12 wherein receiving the selection of information sources to be respectfully associated with cards to be created within the workspace view comprises:
receiving, from the first user, a drag and drop (of an external information source) onto the workspace view to create a card; and
wherein creating and displaying a respective card in the workspace view for viewing by the first user automatically occurs in response to the drag and drop and comprises:
creating and displaying a new card in the workspace view;
creating a new card record in the database to correspond to the new card in the workspace view;
associating an information source identified by the first user to the new card created in the workspace view; and
storing card attributes and an identify of the information source in the new card record in the card database.

15. The method of claim 14 comprising:
based upon placement of the new card in the workspace view, applying at least one relation detection algorithm that causes cards displayed in at least one of the news view, the exchange view and the database view to change.

16. The method of claim 14 wherein storing card attributes in the new card record comprises:
storing a card creation time in the new card record;
storing a card position in the new card record, the card position indicating the positional information of the new card within the workspace view of the first user; and
storing an identity of the first user in the new card record.

17. The method of claim 13 wherein receiving the selection of at least one card from at least one of the news view, the exchange view and the database view for creation of a corresponding card in the workspace view associated with the first user comprises:
dynamically updating information associated with the card in response to changes to the information source associated with the card.

18. The method of claim 13 wherein receiving the selection of at least one card from at least one of the news view, the exchange view and the database view for creation of a corresponding card in the workspace view associated with the first user comprises:

receiving a selection of a card from the exchange view for placement as a card into the workspace view of the first user, the card from the exchange view representing a card displayed in a workspace view of a second user and having at least one relation to other cards in the workspace view of the second user;

placing the selected card from the exchange view in the workspace view of the first user; and wherein identifying a second set of cards based on the at least one relation between the first set of cards comprises:

identifying at least one other card having a card records in the card database that relates to the workspace view of the first user; and wherein displaying the second set of cards on the graphical user interface comprises:

displaying, within the database view, the at least one other card corresponding to the card records in the card database that share a relation to cards in the workspace view of the first user.

19. The method of claim 12 wherein creating and displaying, for each selected information source, a respective card in the workspace view for viewing by the first user comprises:

creating a corresponding exchange card in exchange views of at least one other user to allow that at least one other user to view available cards from the workspace view of the first user.

20. The method of claim 19 comprising:

receiving, from the first user, a specification of viewing levels of exchange cards and database cards by other users based on workspace cards in the workspace of the first user; and selectively displaying cards in exchange view of other users in those other users have viewing levels specified by the first user.

21. The method of claim 19 comprising:

displaying cards in the exchange view and the database view in a priority and relevance order based on relations associated with cards displayed in the workspace view to the first user.

22. The method of claim 19 comprising:

receiving a modification to a card in the workspace view of the first user;

for each card in at least one other view that references the card in the workspace view of the first user, obtaining the modification to allow the card to adapt to the modification of the card in the workspace view of the first user.

23. The method of claim 2 wherein displaying a first set of cards on a graphical user interface comprises:

displaying the first set of cards within a workspace view on the graphical user interface in an organizational arrangement defined by a first user; and wherein identifying at least one relation between the first set of cards comprises:

applying a spatial relation algorithm to analyze the organizational arrangement of the first set of cards defined by a first user to identify spatial relations between cards in the first set of cards; and wherein identifying a second set of cards based on the at least one relation between the first set of cards comprises:

applying a transformation algorithm between card records in the card database to analyze created relations between card records of cards of the first user in the card database to card records of other cards in the card database to identify other cards not already within the first set of cards displayed to the first user in the graphical user interface that have a relation to the cards displayed to the first user; and wherein displaying the second set of cards on the graphical user interface comprises:

displaying, in a second view, the other cards not already within the first set of cards displayed to the first user in the graphical user interface that have a relation to the cards displayed to the first user.

24. The method of claim 2 wherein displaying the first set of cards and displaying the second set of cards comprises:

for each card, displaying, within a card perimeter:

i) a card graphic representing information associated with the card;

ii) a card heading identifying the card;

iii) a plurality of card attribute indicators, each card attribute indicator indicative of a card state, the card attribute indicators identifying ownership and a geographic location of the card.

25. The method of claim 24 comprising:

displaying, within the card perimeter, at least one messaging icon, the messaging icon, the messaging icon operable by a user to send a message to a card associated with at least one other user.

26. The method of claim 12 wherein displaying at least one second view on the graphical user interface comprising:

displaying cards within news view according to a timeline associated with the information displayed by each card.

27. The method of claim 4 wherein identifying the second set of information objects based on the at least one relation between the first set of information objects comprises:

displaying a second set of cards based on analysis of spatial relations between the first set of cards; and wherein the method comprises:

tracking card access data that indicates which cards displayed to a user in the second set of cards are thereafter accessed by the user; and utilizing the card access data as feedback to adjust relationships maintained within the card database.

28. The method of claim 1 wherein identifying that relations in the first set of relations are collectively stronger that relations in the second set of relations comprises at least one of:

i) determining that a sum of the relations in the first set of relations is greater in comparison to a sum of the relations in the second set of relations; and ii) determining that at least one algorithm used to determine relations in the first set of relations is of greater weight than at least one algorithm used to determine relations in the second set of relations.

29. A computer system comprising:

a memory;

a processor;

a display;

an interconnection mechanism coupling the memory, the processor and the display allowing communication there between;

wherein the memory is encoded with a relation manager application, the when executed on the processor, provides a relation manager process that identifies information based on relations by causing the computer system to perform the operations of:

identifying a first set of information objects on the display, each including associated positional information, comprising displaying the first set of information objects, the positional information associated with each information object being a location of each information object on the display;

identifying at least one relation between the first set of information objects based on a spatial arrangement of the information objects on the display as determined by positional information associated with the first set of information objects, wherein identifying at least one relation between the first set of information objects comprises:

computing a first set of relations between at least two information objects;

computing a second set of relations between at least two other information objects;

identifying a second set of information objects based on the at least one relation between the first set of information objects, wherein identifying the second set of information objects based on the at least one relation between the first set of information objects comprises:

identifying that relations in the first set of relations are collectively stronger than relations in the second set of relations; and outputting an identity of the second set of information objects comprising displaying the second set of information objects.

* * * * *

UNITED STATES PATENT AND TRADEMARK OFFICE
CERTIFICATE OF CORRECTION

PATENT NO. : 7,640,511 B1 Page 1 of 1
APPLICATION NO. : 11/118301
DATED : December 29, 2009
INVENTOR(S) : Paul Erich Keel et al.

It is certified that error appears in the above-identified patent and that said Letters Patent is hereby corrected as shown below:

Claim 14, Column 26, Lines 28-30, "receiving, from the first user, a drag and drop (of an external information source) onto the workspace view to create a card; and" should read -- receiving, from the first user, a drag and drop of an external information source onto the workspace view to create a card; and --.

Signed and Sealed this

Sixteenth Day of March, 2010

David J. Kappos
*Director of the United States Patent and Trademark Office*